United States Patent [19]

Genovese et al.

[11] Patent Number: 4,947,549
[45] Date of Patent: Aug. 14, 1990

[54] FIBER ACCESS TOOL

[75] Inventors: Michael Genovese; Hani Nassar, both of Hickory; Terry Morgan, Conover, all of N.C.

[73] Assignee: Siecor Corporation, Hickory, N.C.

[21] Appl. No.: 868,525

[22] Filed: May 30, 1986

[51] Int. Cl.⁵ ............................................. H02G 1/12
[52] U.S. Cl. ....................................... 30/90.8; 81/9.4
[58] Field of Search .................. 30/90.4, 90.8; 81/9.4, 81/9.41–9.44

[56] References Cited

U.S. PATENT DOCUMENTS

| | | | |
|---|---|---|---|
| 2,120,398 | 6/1938 | Edwards et al. | 87/9.42 |
| 3,143,013 | 8/1964 | Freeman | 81/9.44 |
| 3,988,826 | 11/1976 | Heikkala | 30/90.8 |
| 4,070,930 | 1/1978 | Oprins | 81/9.5 B |
| 4,188,841 | 2/1980 | Nakamura | 81/9.51 |
| 4,434,554 | 3/1984 | Korbelak | 30/90.8 |

FOREIGN PATENT DOCUMENTS

| | | | |
|---|---|---|---|
| 2493618 | 5/1982 | France | 30/90.4 |
| 1324321 | 7/1973 | United Kingdom | 30/90.8 |

Primary Examiner—Hien H. Phan
Attorney, Agent, or Firm—J. David Abernethy

[57] ABSTRACT

A tool for slicing the gel filled buffer tube of a loose tube optical fiber construction including a set of blocks having a passage therein through which the buffer tube may be pulled, and a blade extending into the passage which lies within a plane containing the central axis of the passage. The tool may have a second blade oppositely directed from the first blade but spaced apart from the first blade in the longitudinal direction. Both blades may form an acute angle with respect to the passage exit.

11 Claims, 3 Drawing Sheets

FIBER ACCESS TOOL

BACKGROUND OF THE INVENTION

1. Field of the Invention

This invention relates to tools and methods for cutting buffer tubes containing optical fibers.

2. Description of the Prior Art

Various tools have been invented for cutting buffer tubes containing optical fibers. These devices have a blade which makes a circular cut transverse to the axis of the buffer tube.

SUMMARY OF THE INVENTION

A significant portion of fiber optic cables made today is so-called "loose-tube" fiber optic cables, characterized by the fact that an optical fiber is loosely held within a buffer tube. These tubes may contain a plurality of optical fibers. Generally, such constructions include a gel inserted in the interspace between the fiber or fibers and the inner diameter of the buffer tubes.

The present invention is a tool for slicing the buffer tube of a gel filled loose tube buffered fiber optic cable comprising first and second blocks, each block having a groove in a face thereof, which may be mounted and secured to each other in a closed position in order that the grooves form a passage through which the buffer tube is passable. A blade is mounted on a block so that when the blocks are in the closed position, the blade lies in a plane containing the longitudinal axis of the passage; extends from a wall of said passage into the interior of the passage a transverse distance greater than the width of the wall of said buffer tube but is separated from the opposite wall of said passage a transverse distance greater than $D_1+D_2$ where $D_1$ is the width the wall of said buffer tube and $D_2$ is the outer diameter of any optical fiber within said buffer tube; and is disposed at an acute angle with respect to the wall of the passage from which it extends in the direction of an exit of the passage.

The securing means may include a hinge fastened to each block or mounting the blocks on a pair of scissored handles. A second blade can be mounted on the tool to slice the opposite side of the buffer tube when the tool is in the closed position. This blade lies within the plane containing said first blade; extends from a wall of the passage into the interior of the passage towards the wall from which said first blade extends a transverse distance greater than the width of the wall of said buffer tube but is separated from the wall of said passage from which said first blade extends a transverse distance greater than $D_1+D_2$ where $D_1$ is the width of the wall of said buffer tube and $D_2$ is the outer diameter of any optical fiber within said buffer tube; is disposed at an acute angle with respect to the wall of the passage from which it extends in the direction of said exit of the passage; and is spaced apart from said first blade in the longitudinal direction of the passage. In this embodiment, when the buffer tube is sliced the fibers can move in the gel away from the blades to avoid damage to the fiber.

The blades may taper from wide to narrow as they move away from the inner wall of the passage to facilitate splitting of the buffer tube after it is pierced.

If adjustment of the blades is desired, each block may be formed of two block sections which abut within the groove in the block. The sections may be secured by a screw or other fastener to grip the blade and hold it between the block section. Removal of the screw allows adjustment or removal of the blade. A guide may extend from the blocks to guide the buffer tube within the passage for smoother operation. The blade may be notched to fit over a raised shoulder in a block section to keep the blade from slipping out of the block and allow adjustment of the blade penetration.

The tool is operated by sliding it relative to the buffer tube to be sliced, pulling on either the tube or the tool. The tube may then be cut circumferentially at each end of the resulting slit for tube removal if greater fiber access is needed.

An object of the invention is to provide a means for accessing fibers without cutting the fibers, which would necessitate a fiber splice with resulting signal loss. The invention may be used with an unbroken length of cable. Other objects of the invention include ease of manufacture and operation. If the tube contains a plurality of fibers, some fibers may be spliced or rerouted without cutting the remaining fibers, an important consideration in expanding local area networks.

DETAILED DESCRIPTION OF THE PREFERRED EMBODIMENT

Figure 1:
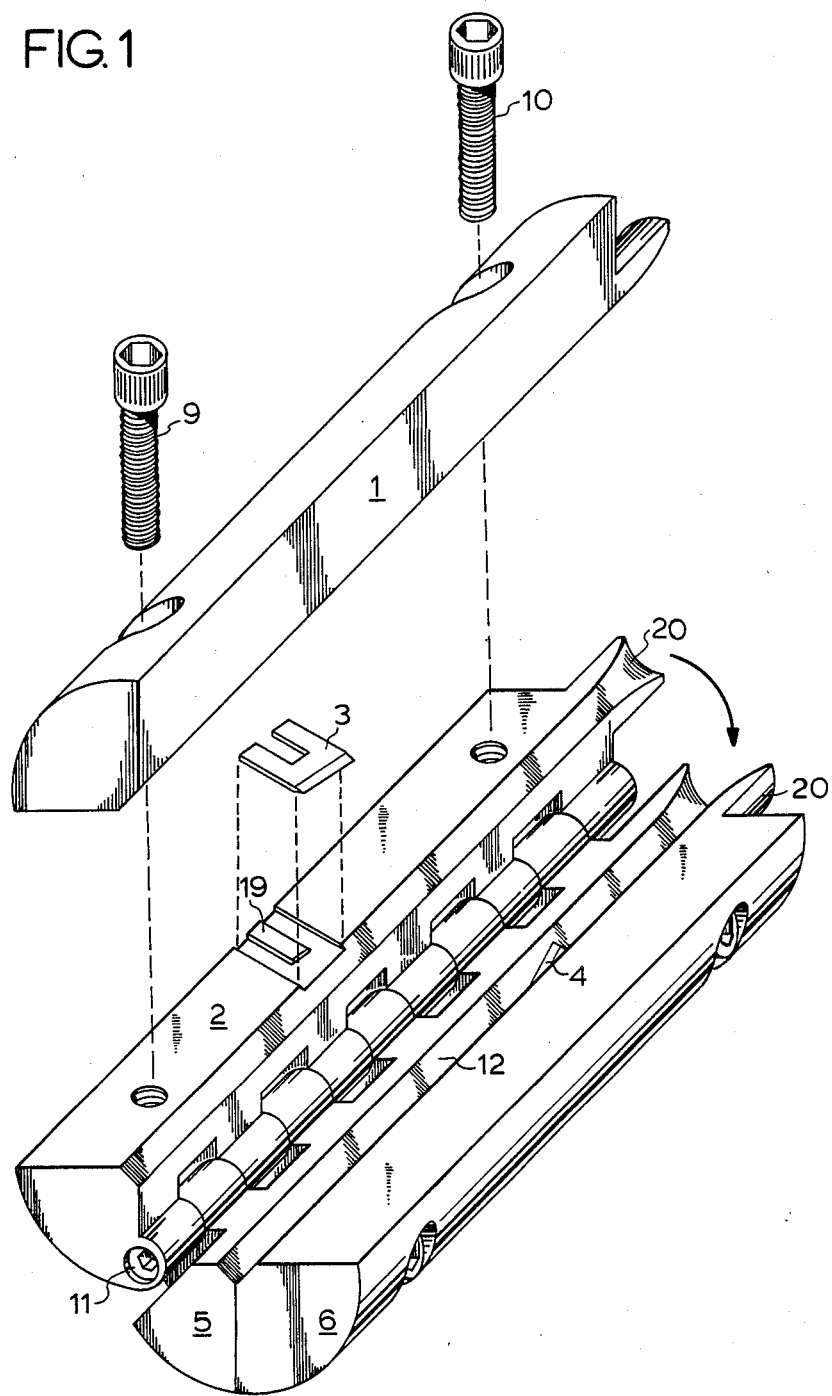
FIG. 1 is a perspective view of the tool in the open position with a pair of block sections disassembled.

FIG. 1 shows the tool in open position. Block sections 5 and 6 are fastened together to form a block having a groove 12. The other block is formed by block sections 1 and 2. Screws 9 and 10 may be used to secure block sections 1 and 2 together, holding blade 3 therebetween so that the blade can be replaced. Blade 3 is notched to fit over shoulder 19 in block section 2 to stabilize blade 3 and allows adjustment of the transverse penetration of the blade. The two blocks are hingeably mounted on hinge 11. A guide 20 extends from each block to guide a buffer tube placed within the passage. Note blades 3 and 4 are opposite to each other but are spaced apart with respect to the longitudinal direction of the passage. The arrow indicates movement in closing the hinge to the closed position.

Figure 2:
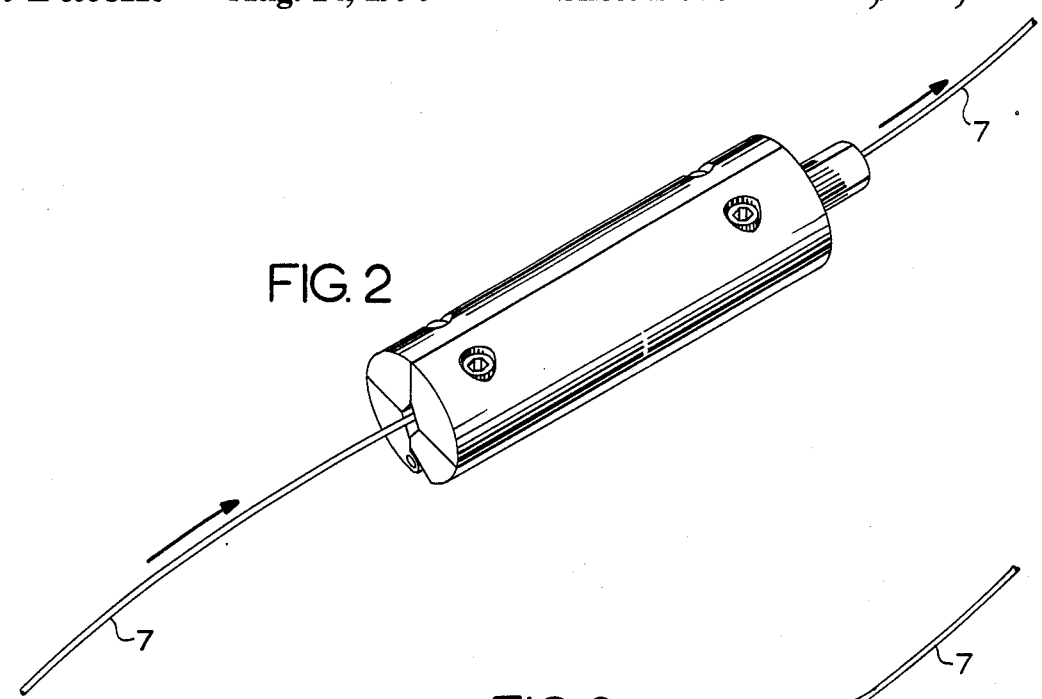
FIG. 2 shows the tool in its closed position around a buffer tube. Arrows indicate the direction of relative movement of the fiber.

FIG. 2 shows the tool in closed position. Arrows indicate the direction of relative movement of the buffer tube when the tool is in operation.

Figure 3:
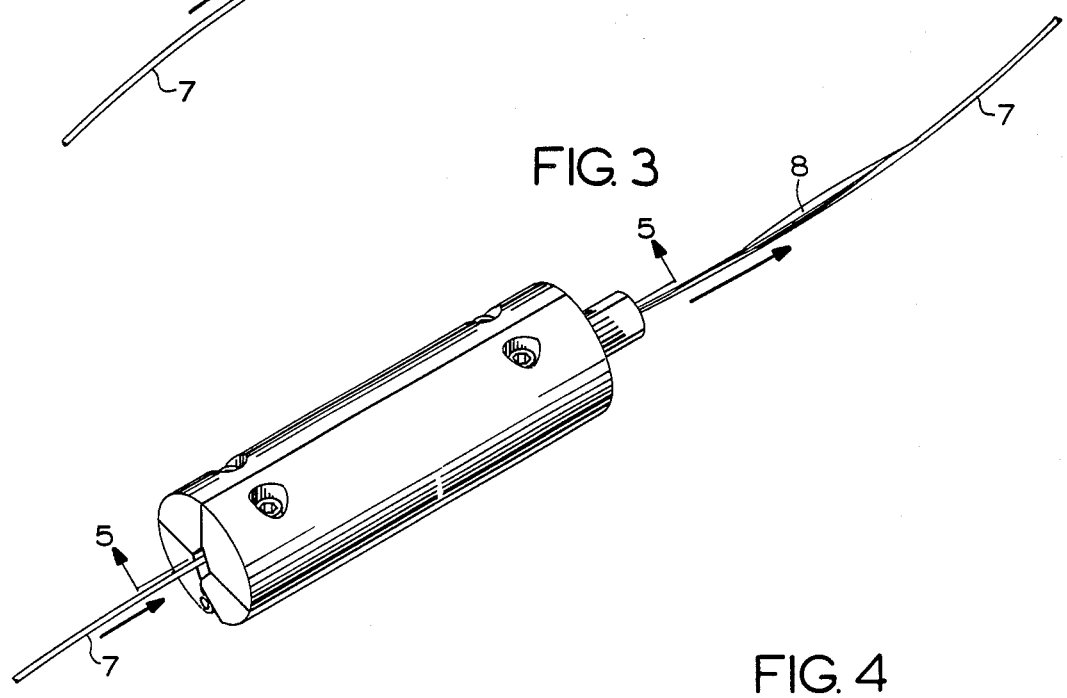
FIG. 3 is the same as FIG. 2 except that the tool has been pulled to the left with respect to the buffer tube, slicing the buffer tube and exposing a section of optical fiber within the buffer tube.

FIG. 3 shows the tool in operation, having split buffer tube 7 to reveal optical fiber 8 therein.

Figure 4:
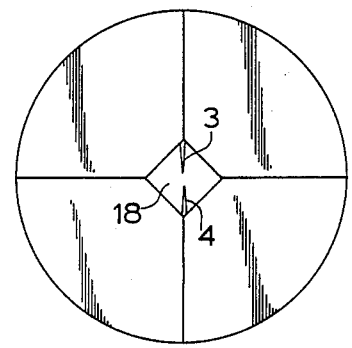
FIG. 4 is an end view of the tool in a closed position with the blades tapering from wide to narrow.

FIG. 4 shows an end view of the tool in closed position, with blades 3 and 4 extending into passage 18. Blades 3 and 4 taper from wide to narrow as they extend into the passage. Passage 18 is formed by groove 12 and the corresponding groove in the other block.

Figure 5:
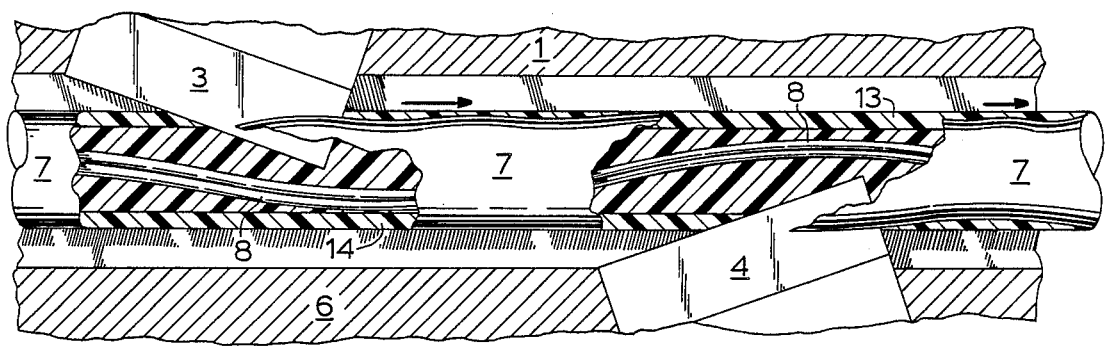
FIG. 5 is a longitudinal sectional view of the tool showing the position of the optical fiber within the buffer tube during the slicing operation.

FIG. 5 is a longitudinal section showing the tool in operation. Blade 3 extends into the passage a distance greater than the width of the buffer tube wall 13, and blade 4 extends into the passage a distance greater than wall 14 of the buffer tube. Optical fiber 8 within the buffer tube 7 has moved within the gel (not shown) filled buffer tube 7 away from blades 3 and 4 which form an acute angle with respect to the buffer tube in the direction of exit of the buffer tube.

Figure 6:
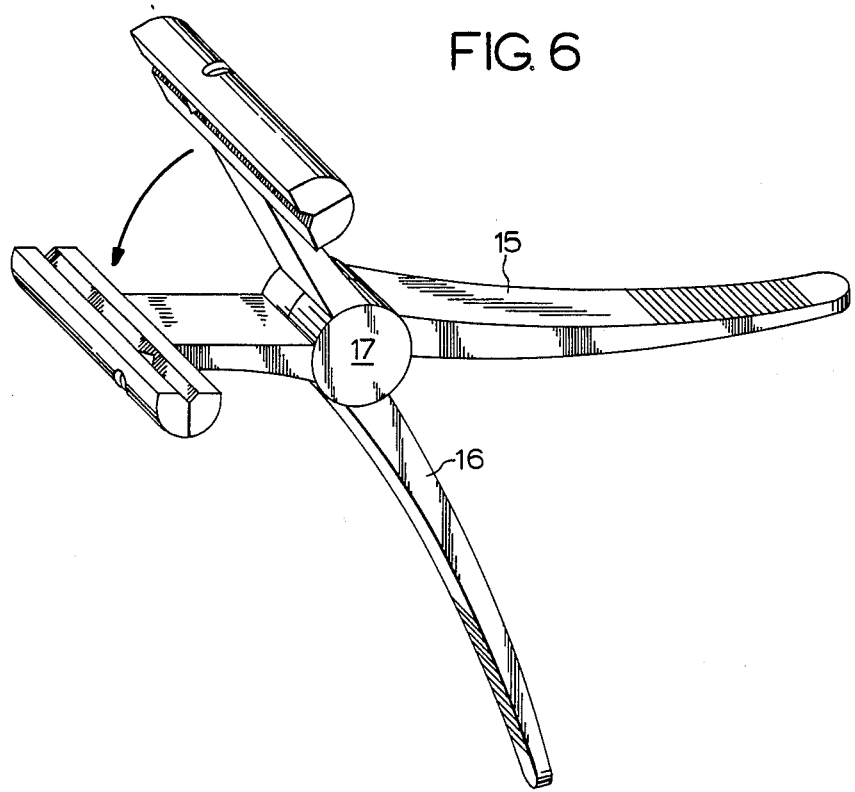
FIG. 6 shows the tool having a pair of scissored handles.

FIG. 6 shows the tool mounted on scissored handles 15 and 16 joined by central pivot 17. In FIG. 6, the passage is transverse to the direction of the scissor movement of the handles. The tool may also be mounted to close to form a passage parallel with the scissor action of handles 15 and 16.

The tool is operated by placing the buffer tube in the passage formed by the blocks in closed position and sliding the tool relative to the buffer tube so that the blades extending into the passage slice the buffer tube. The tool may be used with only one blade or with a second blade opposite from the first blade but spaced apart in the longitudinal direction of the passage from the first blade so that the optical fiber will not have to fit between the narrower space which results if the blades were placed opposite to each other. This will reduce the incidence of damage to the optical fiber by a blade. The blades are placed at an angle to further reduce the possibility of such damage.

The tool could be further modified to have another set of grooves and blades to form a second passage alongside the first passage. The second passage could be of a different size to accommodate buffer tubes of a different size.

What is claimed is:

1. A tube slitting tool, comprising:
   (a) first and second blocks each having a groove in a face thereof;
   (b) securing means for mounting said blocks to each other in a closed position, the grooves forming a passage through which a tube is passable in the closed position; and
   (c) first and second spaced apart blades mounted on the blocks so as to extend into the interior of the passage at an angle of 180 degrees with respect to each other in a common plane containing the longitudinal axis of the passage, said first and second blades not diametrically opposed by any blade, said first and second blades being on opposite sides of a plane perpendicular to the longitudinal axis of the passage, when the blocks are in the closed position.

2. A tube slitting tool as recited in claim 1 wherein each blade is disposed at an acute angle with respect to a groove.

3. A tube slitting tool as recited in claim 1 wherein the securing means comprises a hinge.

4. A tube slitting tool as recited in claim 1 wherein the securing means comprises a handle mounted on each block, the handles mounted scissors-like on a pivot.

5. A tube slitting tool as recited in claim 1 wherein each blade is tapered.

6. A tube slitting tool as recited in claim 1 wherein each blade is movably mounted so as to allow adjustment of the distance of passage penetration.

7. A tube slitting tool, comprising:
   (a) first and second block sections mounted to each other holding a first blade therebetween, and third and fourth block sections mounted to each other holding a second blade therebetween; each said blade extending through a groove formed by the block sections holding the blade; and
   (b) securing means for mounting said blocks to each other in a closed position, in which position
      (i) the grooves form a passage for confining a tube;
      (ii) said blades are spaced apart from each other and extend into the passage at an angle 180 degrees apart from each other in a plane containing the longitudinal axis of the passage, said first and second blades being on opposite sides of a plane perpendicular to the longitudinal axis of the passage, and
      (iii) each said blade is not diametrically opposed by any blade in the passage.

8. A tube slitting tool as recited in claim 7, wherein each blade projects into the passage at an acute angle with respect to a groove.

9. A tube slitting tool as recited in claim 7, wherein the securing means comprises a hinge.

10. A tube slitting tool as recited in claim 7, wherein the securing means comprises two handles mounted on the block sections, said handles mounted scissors-like on a pivot.

11. A tube slitting tool as recited in claim 7 wherein each blade is tapered.

* * * * *